Jan. 5, 1932.                J. M. GRAY                1,839,308

FULL AUTOMATIC BACK STOP

Filed March 5 1930        2 Sheets-Sheet 1

Inventor:
JOSEPH M. GRAY

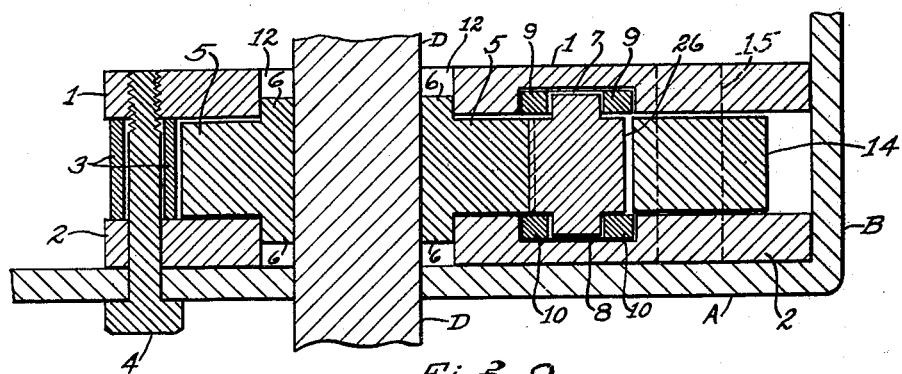

Patented Jan. 5, 1932

1,839,308

UNITED STATES PATENT OFFICE

JOSEPH M. GRAY, OF BROWNSTOWN, INDIANA, ASSIGNOR OF THIRTY PER CENT TO JERRY McOSKER, THIRTY PER CENT TO WILLIAM F. RICHARDS, AND THIRTY PER CENT TO WILLIAM C. BALL, ALL OF BROWNSTOWN, INDIANA

FULL AUTOMATIC BACK-STOP

Application filed March 5, 1930. Serial No. 433,428.

This invention relates to a safety attachment for motor vehicles, whereby the vehicle will be automatically prevented from moving backward accidently or inadvertently, yet without in any way interfering with the forward movements of the vehicle under any speed conditions and without interfering with the vehicle being moved backward intentionally, when it is placed in reverse gear condition.

More specifically, the object of this invention is the provision of a back-stop, or back-lock, for motor vehicles, the same being simple in construction, positive in its actions, full automatic in its operations, occupying but a minimum of space and that entirely in the usual gear-case of the vehicle, the same being easy of operation, simple to effectuate, efficient in practice, and for which the cost thereof will be inconsequential.

Broadly stated, the object of this invention is to provide a full automatic back-stop for various kinds of machinery, the same being adapted to be fully inclosed whereby it will not be liable to damage or deterioration, which can be manufactured at a comparatively low price and installed with comparative ease, thereby making the cost to the consumer practically nil.

Other objects and particular advantages of this invention will suggest themselves in the course of the following description, and that which is new will be correlated in the appended claims.

In the operation of motor vehicles many accidents have resulted because of the vehicle, when left in neutral condition, inadvertently backing downwardly on an incline. This invention overcomes said eventuality by providing automatic means whereby the vehicle can not be backed, except when it is placed in reverse gear, or when being changed from reverse to low gear position, whereby if a vehicle, with which this invention is installed therein, should be left standing headed up an incline it can not possibly move down grade until intentionally placed in reverse gear position.

Figure 1:
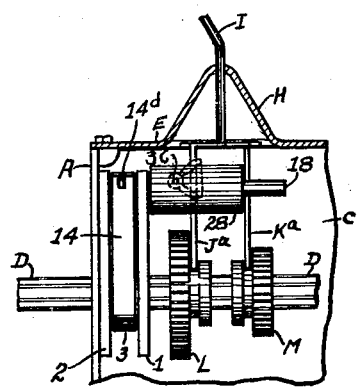
Figure 2:
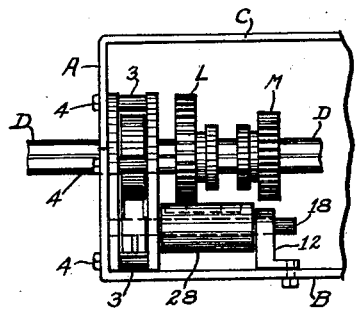
Figure 3:
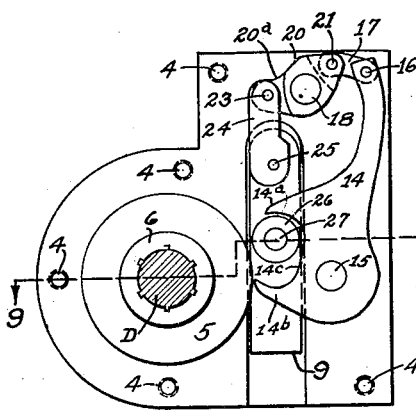

The preferred means for carrying out the objects of this invention in a practical and efficient manner is shown in the accompanying drawings, in which—Figure 1 shows my invention in elevation, in the gear case, the right-hand side of the gear case having been removed. Figure 2 is a top plan view of the device, the top of the gear case being removed. Figure 3 is a rear elevation of my device, as it would appear out of operative position, that is when the gear shift is in reverse position. Figure 4 is a view similar to Fig. 3, but showing my device in engaging position, that is with the gear shift in any other than reverse position. Figure 5 is a perspective view of one of the two vertically movable bars. Figure 6 is a side view of the cam-roller. Figure 7 is a side view of the locking-roller. Figure 8 is an end view of the locking roller. Figure 9 is a horizontal view taken through the device on the line 9—9 of Fig. 3, but taken on an enlarged scale. Figure 10 is a plan view looking directly downward onto a portion of a gear shifting mechanism. And Figure 11 is an elevation, partly in section, as taken at right angles to Fig. 10.

Similar indices denote like parts throughout the several views.

In order that the construction, the operation, and the several advantages of my invention may be more fully understood and appreciated, I will now take up a detailed description thereof, in which I will set forth the same as comprehensively as I may. My invention, in this instance, is employed in connection with a gear-case. Portions of said case are shown in the drawings, as the rear end A, the right-hand side B, and the left-hand side C. A spline shaft D, commonly called the drive-shaft, extends through the gear case. Said case is provided with a top or cover E, which has an upwardly projecting snout H, in which is universally mounted the shifting lever I.

Letters J and K denote plates which are slidably mounted in connection with the cover E, where they are located parallel with each other, and having the respective notches J' and K' formed in their adjoining edges, to receive the lower end of the lever I, whereby either one of said plates may be moved endwise by and reversely to the lever I.

Forming a part of each of said plates is the respective downwardly extending forks J$^a$ and K$^a$, by means of which the respective gears L and M may be shifted selectively.

However this invention is not involved with the parts, which are designated with letters and exponents, except to more nearly make clear the purpose and operation of my invention in connection therewith.

This invention consists of a unitary mechanism, to be located in a gear-case, and it comprises the parts hereinafter referred to by numerals.

The frame of my invention comprises two plates which are substantially parallel with each other, and they are designated as the front plate 1 and the rear plate 2. Said plates are spaced apart by means of a plurality of spacer thimbles 3. An equal number of bolts 4 extends through the rear end A of the gear case, through the rear plate 2, through the respective thimbles 3, and are threaded into corresponding apertures formed through the plate 1, whereby the plates 1 and 2 are not only rigidly connected together but are tightly clamped into connection with the gear-case, inside of which the frame is placed.

The main shaft D extends through both of said plates, but without direct contact therewith. A comparatively large aperture 12 is formed through each plate 1 and 2, and it is concentric with the shaft D. A locking-disc 5 is secured to the shaft D, and it is of larger diameter than are the apertures 12, and it operates between the plates 1 and 2. Said disc 5 has a projecting hub 6 at each side, concentric therewith, and said hubs fit revolvably in the apertures 12, and form bearings for the disc 5.

A vertical channel is formed in the inner opposing faces of the plates 1 and 2, directly opposite to each other, and they are designated by the respective numerals 7 and 8. The sliding bars 9 and 10 fit slidably in their respective channels 7 and 8, in which they may operate up and down, and they are of such thickness as to be flush with the inner faces of the respective plates 1 and 2.

A pivot aperture 11 is formed through the upper end portion of each of the bars, 9 and 10; and near the center of each of said bars a laterally oblong aperture 13 is formed, for the purpose hereinafter explained.

Numeral 14 denotes a dog which is slidably mounted between the plates 1 and 2, and it is mounted, near its lower end, on the pivot 15, which pivot extends between and is secured in the plates 1 and 2.

Said dog has two, spaced apart, jaws 14$^a$ and 14$^b$, which are located between the bars 9 and 10, with an angular face 14$^c$ formed on the inner edge of the dog and extending between the bases of said jaws. The upper portion, or tail, of the dog 14, extends upwardly to near the upper edges of the plates 1 and 2 where it is provided with a slot 14$^d$ through which, and at right angles thereto, is formed an aperture to receive the pivot 16. Numeral 17 denotes a link, one end of which is located in the slot 14$^d$, where it is mounted on the pivot 16.

Numeral 18 designates a counter-shaft, the rear end portion of which is rotatably mounted in and extends between the plates 1 and 2, with its front portion projecting some distance forward beyond the plate 1, with its forward end portion pivoted in the bracket 12, which latter is secured to the member B of the case. Fitting movably between the plates 1 and 2 is the toggle 20, the same being adjustably secured on the shaft 18. One end of said toggle has a slot therein in which fits an end of the link 17, where it is attached by the pivot 21. The other end of said toggle 20 terminates in a tongue 20$^a$, having an aperture therethrough for the pivot 23. Numeral 24 denotes a yoke, which strides the tongue 20$^a$, where it is mounted on the pivot 23. Said yoke fits between the bars 9 and 10 and it is mounted on the pivot 25 which connects said bars 9 and 10. Numeral 26 designates the locking roller, which fits floatably between the bars 9 and 10, with an axle 27 formed to project from each end thereof, which axle is mounted in the oblong apertures 13 of the bars 9 and 10, and said roller 26 is located between the jaws 14$^a$ and 14$^b$ of the dog and it is adapted to move up and down therebetween, carried by the bars 9 and 10.

Rigidly secured on the counter-shaft 18, concentric therewith, is the shifting roller 28. The crux of the whole invention resides in the roller 28, which I will now explain as fully as I may.

Sunken into the periphery of one portion of the roller 28 is a distorted endless channel which extends longitudinally and diagonally, with relation to the roller in which it is formed.

Said channel extends entirely around the elongated substantially diamond-shaped lug 28$^a$, located substantially in the center of and around which said channel extends. Said lug is merely a part of the roller which is not cut away to form said channel. The major outline of said channel comprises the two straight edges 30 and 31, which are parallel with each other but are spaced apart and are offset laterally with relation to each other, and both extend in an axial direction with relation to the roller 28.

The end of the edge 30, nearest one end of the roller, merges into a segmental pocket edge 32; and in a similar manner the end of the edge 31, nearest the other end of the roller, merges into a segmental pocket edge 33. The edge 34 connects the edge 30 with the pocket edge 30ª, and likewise, the edge 35 connects with edge 30 forming the pocket 32. Said edges 34 and 35 are formed slightly curved, bowing slightly away from the lug 28ª, and the edges of the lug 28ª, together with all of said edges of the channel, form tracks for the pintle 36 which projects from the plate J, and which is adapted to travel in said channel.

However, said pintle will, when moving, always travel directly forward and rearward in a relatively straight horizontal line, therefore as the pintle moves forward and rearward, traveling in said channel, it will manifestly cause the roller 28, and the countershaft 18, to rotate reciprocately, thereby transmitting like movements to the toggle 20, and thereby transmitting the proper movements to the various other movable parts set forth.

It should be understood that when the pintle 36 is at the end 32 in the channel formed in the roller 28, the gear will be in reverse position; when it is at the end 33 the gear will be in low position; and when it is midway of the ends 32 and 33, that is at either point 30ª or 31ª, the gears will be in neutral.

In passing from low position 33 to reverse position 32 the pintle 36 will not begin to turn the roller 28 until it reaches neutral position 31ª, but as the pintle travels on the edge 35 the roller 28 will turn until the pintle reaches reverse position at the point 32. When the pintle 36 is moving from position at point 32 to neutral position at 30ª the roller 28 will not move, but as the pintle 37 moves from the neutral position at 30ª to low gear position at the point 33 the roller 28 will be turned back to its original low gear position.

By the above it is manifest that the shaft D will be permitted to rotate reversely, not only when the gears are in reverse position, but also while the gears are being shifted from reverse to low speed position.

The turning of the roller 28 will cause the synchronous operation of the several movable parts of this mechanism in such manner as to cause the roller 26 to engage only when the shaft D attempts to rotate reversely, but while the pintle 36 is at the point 32, or at any place between the points 30a and 32, the roller 26 will be held from wedging position and will therefore allow reverse rotation of the shaft D.

It should be noticed that the roller 28, and consequently the shaft 18, do not revolve but only oscillate, revolvably, the distance equal to the distance between the edges 30 and 31.

It is to be understood that this invention is full automatic in operations, that is to say, the driver of the vehicle with which it is installed need never know of the presence of this construction, except by the results obtained by the employment thereof, as it requires no thought on the part of the operator thereof. For instance, if the driver should leave his vehicle with the gear-shifting lever in neutral, low, high, or in intermediate position, the vehicle will be automatically locked against moving backward, either intentionally or accidentally. But as soon as the shifting lever is moved to either of the forward positions the back-stop will be disengaged as soon as the vehicle starts to move forward. And as soon as the shifting lever is moved to reverse position then the vehicle may be backed either with or without the power of the motor. If so desired the vehicle may be moved backward, not only when the shifting lever is in reverse position, but when it is being moved from reverse to low gear position. It is to be understood however that after the gears have been in reverse speed position it will be necessary to move them into low speed position before moving them to neutral position, if it is desired that the braking means shall be effective for preventing retrograde motion of the vehicle.

Various changes may be made in the details set forth, without departing from the spirit of the invention or sacrificing any of the advantages thereof, which are new and useful.

Having now fully described my invention, what I claim, and desire to secure by Letters Patent of the United States, is—

1. A full automatic back-stop comprising, in combination with a gear-case having a gear shift mechanism therein and a drive shaft extending through said case with its operations adapted to be controlled by said gear-shift mechanism, of a disc secured around said shaft, a roller adapted to rotate on the periphery of said disc, a pivot, a dog mounted on the pivot and having a face adapted to contact with said roller; mechanical means for operating said dog on its pivot, means for raising and lowering said roller by the operation of the gear-shift means, means whereby the lowering of said roller will directly cause said dog to turn toward said shaft and bring the face thereof into contact with the roller whereby the roller will wedge between the disc and the face of the dog when the drive shaft attempts to revolve reversely.

2. In combination with a drive-shaft, a gear-shift mechanism operative upon said shaft, and a lever for controlling said gear-shift mechanism, of a disc rigidly secured around said shaft, a roller adapted to contact with said disc, a dog having a movable face adapted to contact with said roller at a position approximately opposite to that of the contact of the roller with said disc, mechanical means automatically operative for raising and lowering said roller, thereby providing a mechanism for lowering said roller and simultaneously moving said face toward said disc and conversely for simultaneously raising said roller and moving said face further from said disc, by the operation of the gear-shift lever.

3. In combination with a gear-case having a drive-shaft extending therethrough and a gear shifting mechanism connected with said shaft, a back-stop mechanism located in said case and comprising a pair of spaced apart plates secured to the case, a disc secured on said shaft and located between said plates, a roller revolvable in contact with said disc and located between said plates, a dog having an angular face adapted to contact with said roller, means whereby said dog may be turned laterally to move said face toward or from said disc with the roller therebetween, means operative by the operation of the gear shift mechanism for automatically raising said roller and for moving said face in a direction away from said disc and for lowering said roller and moving said face toward said disc.

4. In combination with a gear-case having a drive-shaft extending therethrough, a gear-shift mechanism connected with said shaft and located in said case, and a lever for shifting the gear shift mechanism, a back-stop mechanism located in said case and comprising a pair of spaced apart plates, a disc secured around said shaft and located between said plates, a roller extending between said plates and in rolling contact with the periphery of the disc, a dog located between said plate and having an angular face adapted to contact with said roller, means whereby said dog may be turned to move the face thereof toward or from said disc with the roller therebetween, means for automatically raising and lowering said roller, means for automatically moving said face away from and toward said disc, in order to release said roller from or to place it in wedging contact with said face and said disc, and means whereby the raising or lowering of the roller and moving said face away from or toward said disc is accomplished simultaneously by the operation of said lever.

5. In combination with a gear-case having a drive-shaft extending therethrough and a gear shift mechanism connected with said shaft and a gear shift lever connected with said mechanism, a back-stop mechanism located in said case and comprising a pair of spaced apart plates attached to the case, a disc secured around said shaft and located between said plates with its hubs revolvable in apertures in said plates, a roller extending between said plates and parallel with said shaft and in revolvable contact with the periphery of said disc, a dog located between said plates and having an angular face adapted to contact with said roller, means whereby said dog may be turned to move said face toward or from said disc with the roller therebetween, means for raising and lowering said roller, means controlled by the operation of the gear shift mechanism for automatically raising said roller and for moving said face in a direction away from said disc, and for lowering said roller and for moving said face toward said disc, to cause said roller to wedge between said face and the disc when said disc attempts to turn reversely, but permitting the disc to at all times turn forwardly.

6. In combination with a shaft adapted to revolve forward or backward and a gear mechanism for changing the speed and the direction of rotation of said shaft, a unitary structure comprising a pair of plates spaced apart, a disc pivoted to revolve between said plates and secured to and concentric with said shaft, a dog having a face directed toward and spaced from the periphery of said disc, a pair of bars slidable vertically in channels formed in the opposing faces of said plates and located between said dog and disc but not in alinement therewith, a roller loosely pivoted to said bars and extending therebetween and adapted to be engaged between said disc and the face of said dog, a counter-shaft pivoted in and extending between said plates and extending therebeyond, a toggle secured on the counter-shaft and located between said plates, a link connecting one end of the toggle with said dog, a yoke connecting the other end of the toggle with said bars, a cam roller secured on the counter-shaft and having a cam channel formed in the face thereof and extending longitudinally and spirally thereof, and a pintle having its free end located in said cam channel and having means causing the pintle to travel directly horizontal and reciprocately in a straight line but causing said cam roller to oscillate revolvably to impart movements to said dog and roller as set forth.

7. In combination with a shaft adapted to rotate forwardly and backwardly, a pair of spaced apart plates forming a frame at right angles to the shaft, a disc fitting revolvably between said plates, an axle associated with said disc with said axle revolvably mounted in apertures in said plates, and extending centrally through and concentric with said disc with the disc rigidly secured to said shaft, a dog located between said plates and having an angular face spaced from the periphery of said disc, means for pivoting said dog whereby the movements thereof will cause said face to move toward and from said disc, a floating roller located between said face and the periphery of said disc, means whereby as the face of the dog moves away from the disc the floating roller will move upward and as the face of the dog moves toward said disc the floating roller will be lowered, an oscillating roller having a diagonal channel in its face, a horizontally movable pintle operative in said channel to cause the oscillating roller to turn a limited distance alternately to the right and the left, a counter shaft on which the oscillating roller is secured, and means for causing said shaft to swing said dog laterally and synchronously therewith move said floating roller vertically in order to place the floating roller into and out of wedging condition between said face of the dog and the periphery of the said disc.

8. A back-stop comprising a floating roller, a disc with which said roller may contact, a dog having an angular face to contact with said roller, means whereby said dog may be turned to move said face toward or from said disc with said roller therebetween, means for raising and lowering said roller, an oscillating roller having a channel in its face, a counter-shaft on which the last mentioned roller is secured, means connecting the counter-shaft to operate said dog and at the same time raising or lowering the floating roller, a pintle carried forward and backward horizontally with said pintle projecting continuously into said channel whereby the movements of said pintle will cause said counter-shaft to oscillate and by which said dog will swing laterally and the floating roller will be moved vertically at the same time, and means whereby when the face of the dog is moved to its limit away from said disc and at the same time the floating roller is raised upwardly to its limit the said disc will be free to revolve either forward or backward and when the face of said dog is moved to its limit toward said disc and at the same time the floating roller is lowered to its limit, then the disc will still be free to revolve forwardly but will be locked from revolving reversely.

9. In combination with a drive-shaft, a gear shifting mechanism connected with said shaft, and means for shifting said gears from one to the other of various forward speeds or to reverse position, of a disc mounted around said shaft and secured thereto, a roller in contact with the periphery of said disc and adapted to be raised and lowered, a face adapted to be moved toward and away from said roller, means whereby when said gears are in reverse position, or when being moved from reverse to low gear position, the said roller will be raised to its limit and said face will be at its maximum limit of movement away from said disc thereby permitting the shaft to rotate forward or backward, while if the gears are in any other position, than that mentioned above, the said roller will be at its downward limit of movement and the said face will be at its nearest point of approach to said disc whereby the shaft can not be rotated reversely but can still be rotated forwardly.

10. In combination with a shaft, a disc secured to and concentric with said shaft, a roller extending parallel with said shaft and in revolvable contact with the periphery of the disc, a dog having an angular face adapted to contact with said roller, means whereby the dog may be turned to move the said face thereof toward or from said disc with the roller therebetween, means for raising and for lowering said roller automatically and for simultaneously but independently moving the face of the dog away from or toward said disc.

11. In combination with a shaft, a disc secured to and concentric with said shaft, a roller extending parallel with said shaft and in contact with the periphery of said disc, a dog having a pair of jaws spaced apart with an angular face extending between said jaws with said roller adapted to contact with said jaws and said angular face, a pivot upon which said dog is mounted whereby the dog may be turned to cause said face and jaws to be moved toward and from said disc, a shifting roller spaced from and parallel with said shaft, a counter shaft to which the shifting roller is secured, automatic means for oscillating said counter shaft, and toggle mechanisms connecting the counter shaft with said dog and with said roller whereby the dog and roller will operate simultaneously but in directions different from each other.

12. In combination with a main shaft, a disc secured to and concentric with said shaft, a roller adapted to revolve in contact with the periphery of said disc, a dog having an angular face terminating at each end with a jaw, with said roller adapted to contact with said angular face and limited in its movements by said jaws, a pivot on which the lower portion of the dog is mounted whereby movements of the upper end of the dog will move its angular face toward and from the periphery of said disc, a counter shaft located parallel with the main shaft, a shifting roller secured to the counter shaft, means for automatically causing the counter shaft to be given oscillating movements only, means whereby the movements of the counter shaft in one direction will cause said roller to move upward and at the same time swinging the dog and thereby causing the angular face thereof to move in a direction away from said disc, while if the counter shaft is moved in the other direction it will cause the roller to move downward and simultaneously causing the angular face of the dog to move toward said disc.

13. In combination with a gear shifting mechanism including a pair of shifting plates; a counter shaft spaced from and parallel with said plates, an oscillating roller secured on said counter shaft, there being a distorted endless channel sunken into the periphery of one portion of the said roller and extending longitudinally and diagonally thereof, a pintle projecting from one of said shifting plates with its free end located in said channel whereby the lateral shifting of said plate, to which said pintle is attached, will transmit to the shifting roller, and the counter shaft, an oscillating rotary motion.

14. In combination with a main drive shaft and a gear shifting mechanism including a laterally movable shifting plate; a counter shaft spaced from and parallel with said plate and main shaft, a shifting roller secured on said counter shaft and concentric therewith, there being a distorted endless channel sunken into the periphery of one portion of the shifting roller and extending longitudinally and diagonally thereof, a pintle projecting from said shifting plate with its free end located in said channel whereby the horizontal movements of the shifting plate will cause revolvable oscillating movements to be transmitted to the counter shaft, a roller adapted under certain conditions to prevent the rotation of said main shaft in one direction, and means whereby the movements of the counter shaft will place said roller into or out of operative condition with relation to the main shaft.

JOSEPH M. GRAY.